(12) United States Patent
Butler et al.

(10) Patent No.: US 7,127,410 B1
(45) Date of Patent: Oct. 24, 2006

(54) PROCESS FOR OBTAINING A SERVICE FOR MULTIPLE ENTITIES WITHIN AN ORGANIZATION

(75) Inventors: Linda G. Butler, Fayetteville, GA (US); Kim M. Ford, Washington, DC (US); Robert D. Lamb, Atlanta, GA (US); Beverly J. Skinner, McDonough, GA (US); Lori S. Groves, Fayetteville, GA (US); Julie Stein, Birmingham, AL (US); Michael Bradley, Birmingham, AL (US); Deborah P. Rochon, Stone Mountain, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 1101 days.

(21) Appl. No.: 10/025,649

(22) Filed: Dec. 19, 2001

(51) Int. Cl.
*G06F 17/50* (2006.01)
(52) U.S. Cl. ............................................. 705/7
(58) Field of Classification Search ................ 701/1, 701/7, 10; 717/101; 705/7
See application file for complete search history.

(56) References Cited

U.S. PATENT DOCUMENTS 6,526,387 B1 * 2/2003 Ruffin et al. .................. 705/7
6,718,535 B1 * 4/2004 Underwood ................ 717/101
6,738,736 B1 * 5/2004 Bond ............................ 703/2
6,738,746 B1 * 5/2004 Barnard et al. ................ 705/7
2002/0069102 A1 * 6/2002 Vellante et al. ............... 705/10

OTHER PUBLICATIONS

Cassidy "A Practical Guide to Information Systems Strategic Planning"; 1998, St. Lucie Press, chapter 5.☐☐.*
Martin Analysis and Design of Business Information Systems, 1995, Prentice-Hall, 2d. Edition, Chapter 3.*
Ward et al "Strategic Planning for Information Systems", 1996, John Wiley & Sons, pp. 156-538.*

* cited by examiner

*Primary Examiner*—Romain Jeanty
(74) *Attorney, Agent, or Firm*—Lee & Hayes, PLLC

(57) ABSTRACT

A framework defines a minimum set of requirements that all entities within an organization must adhere to when acquiring an information technology (IT) product. The framework has a first policy that each entity of the organization must follow the framework, a second policy defining a business process that each entity must follow when acquiring an IT product, a third policy defining a set of tools for being employed to implement the business process of the second policy; and a fourth policy defining additional requirements specific to one or more of the entities within the organization, where the additional requirements for each entity are defined by such entity.

24 Claims, 3 Drawing Sheets

PROCESS FOR OBTAINING A SERVICE FOR MULTIPLE ENTITIES WITHIN AN ORGANIZATION

FIELD OF THE INVENTION

The present invention relates to a process that is employed to obtain 15 a service for multiple entities within an organization. More specifically, the present invention relates to a process for obtaining a service such as an Information Technology (IT) service from an IT product provider, wherein the obtained service satisfies each of the multiple entities of the organization.

BACKGROUND OF THE INVENTION

A large organization such as a large corporation may have many constituent entities, including divisions, groups, sectors, wholly and partially owned subsidiaries, local office units, etc. Moreover, each constituent entity may require IT products as part of the continuing operation thereof. Such IT products are many and varied, and for example include office furniture, office supplies, vehicles, raw materials, computer equipment, and computer software. Especially with regard to Information Technology (IT) services, such IT products can include specialized and standardized hardware, specialized and standardized software applications, technical support, technical management, and the like.

IT services are in general currently being consolidated from localized IT centers into more globalized IT centers. Such consolidation is good in that IT products and services are being provided for constituent entities of a single organization by one or a few IT centers, as opposed to a different IT center for each entity. Such consolidation is problematic, however, in that the uniform approach that an IT center may apply to a plurality of the entities in an organization may in fact satisfy none of the entities. Put another way, a single IT product may be developed by the IT center to perform an overall function for the plurality of entities, and the single IT product may in fact perform well under a given operating environment. However, if none of the plurality of entities in fact has such an operating environment, all of such entities are dissatisfied, and the single IT product is in fact less than optimal if not useless. Similarly, if the single IT product works marginally well for the overall needs of all of the plurality of entities yet does not work substantially well for any of the plurality of entities, all of such entities are again dissatisfied and the single IT product is again in fact less than optimal if not useless.

As an example, consider first and second entities within the organization that both require an IT product or service such as a piece of software that performs an accounting function. However, and importantly, the first entity (and not the second entity) requires that the software perform a specific interfacing function with another piece of software, and the second entity (and not the first entity) requires that the software perform a specific printing function with a specialized printer. If the first entity orders the IT product without any input from the second entity, the printing function will be missing and the IT product will be useless to the second entity. Likewise, if the second entity orders the IT product without any input from the first entity, the interfacing function will be missing and the IT product will be useless to the first entity. Worse yet, if a third entity orders the IT product without any input from the first or second entities, the printing function and interfacing function will be missing and the IT product will be useless to both the first and the second entities.

Accordingly, a need exists for a process for obtaining such IT products. In particular, a need exists for such a process that obtains an IT service for multiple entities within an organization such that the obtained IT service satisfies the needs of each entity. More generally, a need exists for a formalized approach to obtaining an IT service such that each entity within an organization is obligated to obtain an IT service in such formalized manner.

SUMMARY OF THE INVENTION

The present invention satisfies the aforementioned need by setting forth a framework in connection with an organization having a plurality of entities, where the framework defines a minimum set of requirements that all entities within the organization must adhere to when acquiring an information technology (IT) product. The framework has a first policy that each entity of the organization must follow the framework, a second policy defining a business process that each entity must follow when acquiring an IT product, a third policy defining a set of tools for being employed to implement the business process of the second policy; and a fourth policy defining additional requirements specific to one or more of the entities within the organization, where the additional requirements for each entity are defined by such entity.

In the business process of the second policy, a business idea regarding acquiring an IT product is initiated, where the business idea is based on factors including available technology and a rough feasibility estimate of cost and benefit. The rough estimate is developed into a detailed estimate including a cost of and a benefit of acquiring the IT product. The detailed estimate is employed to decide if and how to acquire the IT product and coincides with composing a proposal including a funding request for funding from the organization for acquiring the IT product.

The proposal is submitted to a centralized prioritizing agent for the organization. The centralized prioritizing agent performs a prioritization process including examining all proposals within the organization and determining whether to approve each proposal based on factors including need, cost, available funding, and priority. Upon receiving approval from the centralized prioritizing agent, requirements and planning are developed for the IT product to be acquired by specifying the IT product in a more technologically specific manner, and delivery of the IT product is received.

BRIEF DESCRIPTION OF THE DRAWINGS

The foregoing summary as well as the following detailed description of the present invention will be better understood when read in conjunction with the appended drawings. For the purpose of the illustrating the invention, there are shown in the drawings embodiments which are presently preferred. As should be understood, however, the invention is not limited to the precise arrangements and instrumentalities shown. In the drawings.

DETAILED DESCRIPTION OF PREFERRED EMBODIMENTS

Figure 1:
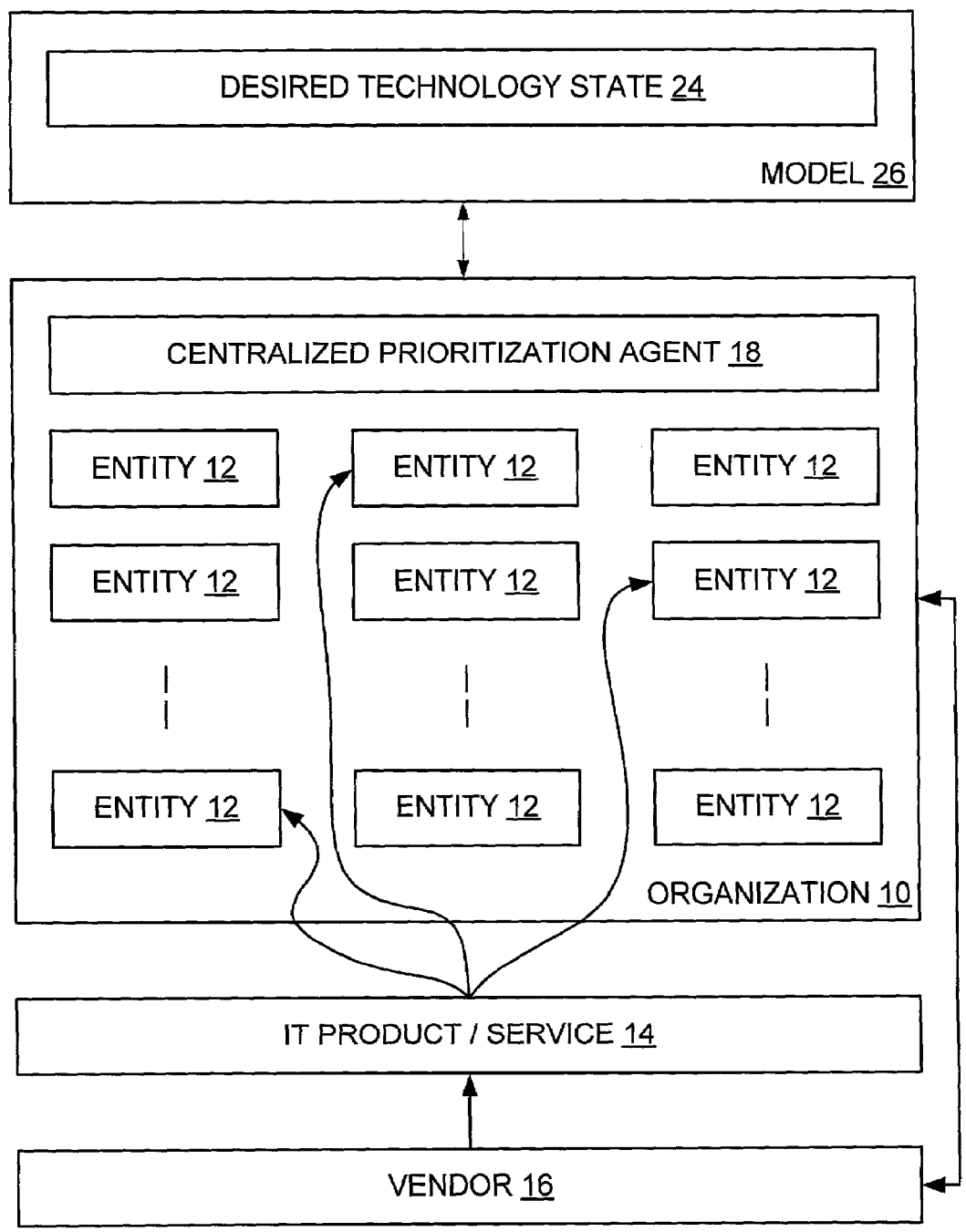
FIG. 1 is a block diagram showing an organization and a centralized prioritizing agent (CPA) thereof interacting with a vendor to supply an IT product or service to at least one of the entities within the IT product.

Referring to the drawings in detail, wherein like numerals are used to indicate like elements throughout, there is shown in FIG. 1 a relatively large organization 10 such as a large corporation that has many constituent entities 12, including divisions, groups, sectors, wholly and partially owned subsidiaries, local office units, etc. Note that the organization 10 may have any particular size and any particular organizational structure without departing from the spirit and scope of the present invention.

As may be appreciated, although within the same organization 10 as separate entities 12, at least some of the entities 12 may in fact share common functions. For example, some of the entities 12 may function to sell a particular product or service, but each entity 12 has a particular sales region. Alternatively, some of the entities 12 may function to supply materials to other entities 12, but each entity 12 is responsible for a different material. At any rate, it is likely if not a virtual certainty that at least some of the constituent entities 12 within the organization 10 may require substantially the same information technology (IT) products and services 14 as part of the continuing operation thereof. Such IT products 14 are many and varied and can be any particular IT products 14 without departing from the spirit and scope of the present invention. For example, and as was discussed above, the IT products 14 can include standardized and specialized computer hardware, standardized or specialized computer software, references, etc. Such IT products 14 may also include professional services, training, technical assistance, or the like.

Especially with regard to an IT product 14 such as a specialized software application 14, but equally applicable to any other IT product 14, a formalized process is employed in one embodiment of the present invention to acquire such IT product 14. Accordingly, only one vendor 16 need be dealt with by the organization 10 on a continuing basis with regard to such IT product 14. Moreover, the cost of the IT product 14 to the organization 10 may be reduced by the one vendor 16 based on the ability of the vendor 16 to amortize development costs in connection with the IT product 14 across multiple entities 12. In fact, it may be the case that based on the amount of business to be done with the organization 10, the one vendor 16 may decide to assume the development cost itself in an effort to obtain the business from the organization 10.

The formalized process of the present invention is in general a business process for acquiring an IT product 14 and thus is a way to do something that each entity 12 presumably follows. Acquiring technology and the like, however, is often adverse to a business process because technology is often acquired in response to an immediate demand, and therefore is done in a hurry and without regard for niceties such as a deliberative review that a business process embodies. Ideally, then, the first part of the business process of the present invention is that each entity 12 agrees or is bound to following such business process.

Figure 2:
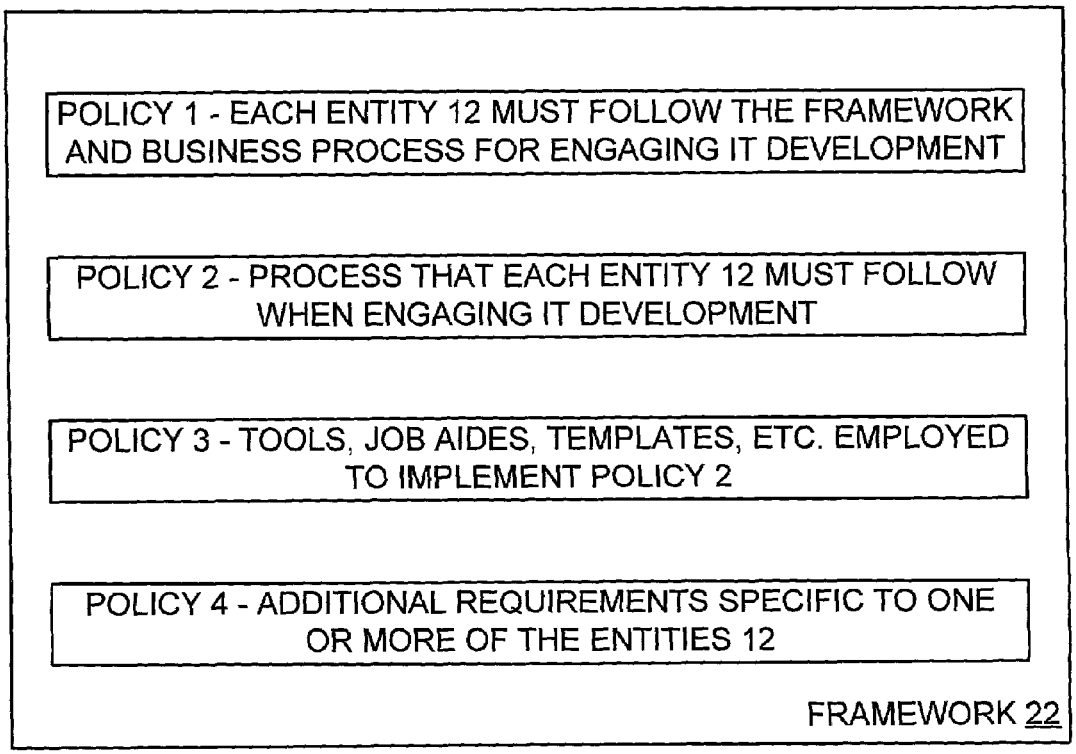
FIG. 2 is a block diagram showing a framework of minimum requirements that all entities within the organization of FIG. 1 and all projects for acquiring IT products must adhere to, in accordance with one embodiment of the present invention.

In one embodiment of the present invention, and referring now to FIG. 2, a framework 22 defines a minimum set of requirements that all entities 12 within the organization 10 and all projects for acquiring IT products 14 must adhere to. Generally, the framework 22 represents a high-level approach that defines a minimum set of requirements for any IT acquisition project. As will be appreciated, the framework 22 leaves many if not most low-level decisions to each entity 12 within the organization 10, especially inasmuch as each entity 12 may be different and operate differently, and because each entity 12 may have a different business goal. Nonetheless, each entity 12 does perform some basic and common operations.

More specifically, in one embodiment of the present invention, the framework 22 comprises a number of policies with regard to engaging the development of an IT product. Policy 1 is, as was discussed above, that each entity 12 of the organization 10 must follow the framework and business process for engaging IT development. Typically, such policy is promulgated by management within the organization 10. Such policy also states that different entities 12 must work together to engage IT development when the IT product to be developed is substantially common to both entities 12.

Policy 2 is the actual business process as will be discussed below in more detail, and thus sets out a minimum set of requirements that each entity 12 must follow in the course of engaging IT development. Such policy also sets forth a common set of definitions of all the rules and responsibilities for personnel in the technology community in the course of engaging IT development.

Policy 3 includes a minimum set of tools, job aides, templates and the like that are employed to implement Policy 2. For example, Policy 3 includes forms that are to be used during each stage of the business process set out in Policy 2. Policy 3 may be embodied in the form of a central repository accessible by all of the entities 12 within the organization. Such repository may for example be a database accessible by way of an Internet or Intranet web page.

Policies 1–3 are applicable across all entities 12 within the organization 10, and therefore define a minimum set of requirements with regard to all such entities 12. Recognizing that each entity 12 is different and may require additional defined requirements, Policy 4 includes such additional requirements as appropriate and necessary, where such additional requirements may be specific to one or more of the entities 12. Essentially, such policy requires that each entity 12 in fact defines its own additional requirements.

Figure 3:
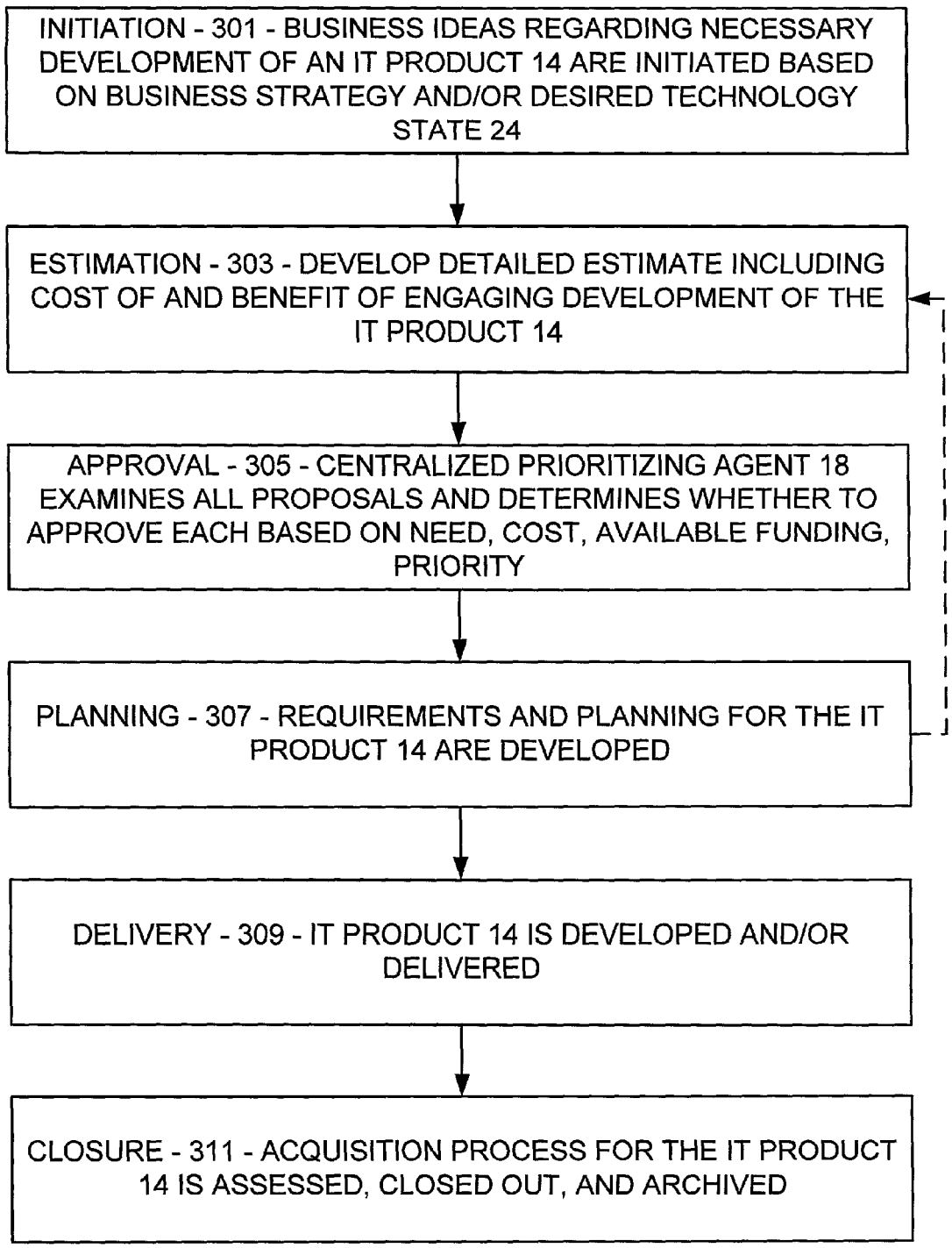
FIG. 3 is a flow diagram showing steps of a business process of Policy 2 of FIG. 2 in accordance with one embodiment of the present invention.

In the business process of Policy 2, and referring now to FIG. 3, every engagement of IT development from every entity 12 within the organization 10 follows the same basic steps, including initiation (step 301), estimation (step 303), approval (step 305), planning (step 307), delivery (step 309), and closure (step 311). In the course of performing such steps, and as will be disclosed below, a desired technology state 24 (FIG. 1) may be referred to during the initiation step in the course of deciding whether to pursue development of an IT product for an entity 12. The desired technology state 24 is essentially a statement of where the entity 12 is desired to be in a technological sense. The desired technology state 24 for each entity 12 is pre-defined, perhaps by a planning entity 12 within the organization 10, or by a planning consultant engaged by the organization 10. In one embodiment of the present invention, the desired technology state 24 as pre-defined is placed within and obtained from a model 26 that takes into account such factors as infrastructure, data, common systems, business units, and customer interfaces. For each factor, the model 26 defines for each entity 12 in the organization 10 where the entity 12 is currently and where such entity 12 is desired to be.

Importantly, the model 26 takes into account that different entities 12 within the organization 10, although performing different functions, nevertheless have common requirements and operations. For example, every entity 12 may require a human IT products department and/or a facilities management department. The model 26, then, is a conscious effort to handle common operations in a coordinated fashion. Thus, and as an example, every human resources department should use the same human resources IT product 14, and every facilities management department should use the same facilities management IT product 14. Accordingly, each individual entity 12 does not waste resources developing its own IT product 14 when a common IT product 14 can be employed, and the common IT product 14 likely represents a substantial cost savings to the organization 10, both in terms of support and operation thereof. In conjunction with each common IT product 14, then, the model 26 defines or at least aspires to define a specific vendor or supplier 16 that is designated to supply the common IT product 14 to all entities 12 within the organization 10 that require such common IT product 14.

The above steps of Policy 2, including, including initiation (step 301), estimation (step 303), approval (step 305), planning (step 307), delivery (step 309), and closure (step 311) are discussed in more detail as follows:

INITIATION (step 301)—In the very early inception of the recognition of a need for engaging development of an IT product 14, and perhaps even before the actual business process of the present invention takes place, each entity 12 should have a desired technology state 24 as was discussed above and as obtained from the model 26. In addition, or in the alternative, each entity 12 may have a business strategy that defines direction. Based on the business strategy and/or the desired technology state 24, among other things, then, business ideas regarding necessary development of a particular IT product 14 are initiated. Such business ideas should be based on one or more problems that are to be solved, types of technology available, and especially the desired technology state 24 for the entity 12 as obtained from the model 26 and the applicability of the desired IT product 14 to such desired technology state 24. Moreover, such business ideas should be based on at least a rough-guess feasibility estimate of cost and benefit.

ESTIMATION (step 303)—After INITIATION, the rough-guess estimate is developed into a detailed estimate including the cost of and the benefit of engaging the development of the IT product 14. Such detailed estimate is based on developing a business program based on such items as a business case and a program plan. The detailed estimate is more refined and is the basis for making a decision on if and how to engage the development of the desired IT product 14. The detailed estimate also coincides with composing a funding request for funding from the organization 10, and with a determination that developing the desired IT product 14 goes toward a business solution that is needed for achieving the desired technology state 24.

APPROVAL (step 305)—After ESTIMATION, a proposal based on the detailed estimate is forwarded to a centralized prioritizing agent 18 for the organization 10 (FIG. 1). As may be appreciated, the centralized prioritizing agent 18 performs a prioritization process that examines all proposals within the organization 10 and determines whether to approve each proposal based on factors including need, cost, available funding, a priority assigned to the proposal and the like.

Importantly, the centralized prioritizing agent 18 refers to the aforementioned model 26 and the desired technology state 24 for the entity 12 to ensure that the desired IT product 14 furthers the goal of achieving the desired technology state 24 for the entity 12. Also importantly, the centralized prioritizing agent determines from the model 26 whether the IT product 14 that is the basis of the proposal is common to entities 12 other than just the entity 12 that submitted the proposal. If so, the centralized prioritizing agent 18 communicates with all of such entities 12 to ensure that the IT product 14 that is the basis of the proposal will satisfy the needs of every such entity 12. For example, the centralized prioritizing agent may circulate the proposal to such entities 12 for review, comment, and approval, or may initiate a task force of representatives from each such entity 12 to review, comment on, and approve the proposal.

PLANNING (step 307)—Once APPROVAL for a proposal for developing an IT product 14 is granted by the centralized prioritizing agent 18 and once the IT product 14 is funded, a project to develop the IT product 14 proceeds to the stage where the requirements and planning for the IT product 14 are developed. Here, the IT product 14 to be developed is specified in a more technologically specific manner than before. With regard to the entities 12 of the organization 10 that will employ such IT product 14, as determined during APPROVAL (step 305), such specification requires considerable input from technologically oriented members of each such entity 12 regarding how the IT product 14 should be developed and how the IT product 14 should perform, as well as considerable input from business oriented members of each such entity 12 regarding what the IT product 14 should do and the purpose of the IT product 14. Based on the planning and requirements, it may then be necessary to revisit ESTIMATION and APPROVAL (steps 303 and 305) to determine the reasonableness thereof. If ESTIMATION and APPROVAL are no longer valid as a result of PLANNING, it may be necessary to go back to ESTIMATION, as seen in FIG. 3.

DELIVERY (step 309)—Once planned, the IT product 14 must be developed and/or delivered. That is, the planned IT product is purchased, designed, developed, constructed, produced, built, tested, implemented, and the like so that all specifications for the IT product 14 from PLANNING are satisfied. Typically, DELIVERY is supported by the organization 10 by key personnel from each entity 12 that is to receive the developed IT product 14, where such personnel manage and monitor DELIVERY. In addition, personnel from the centralized project agent 18 may also supervise DELIVERY.

Significantly, at some point during ESTIMATION, APPROVAL, PLANNING, and DELIVERY (steps 303–309), one or more vendors 16 are selected, where each vendor 16 is capable of delivering the IT product 14 to the organization 10 and the requesting entities 12 thereof. Such selection may occur at any appropriate step without departing from the spirit and scope of the present invention. Note that the selection of each vendor 16 may be performed by one or more of the receiving entities 12, by the centralized prioritizing agent 18, or by a combination thereof. Such selection may be performed based on any appropriate basis, including by suggestion of an entity 12, by a bidding procedure, by experience, by a pre-existing relationship between the organization 10 and the vendor 16, or the like.

A particular vendor 16 may be selected based on the ability to supply all of the requirements of the organization 10 for the IT product 14. The selected vendor 16 may be designated as the sole vendor 16 to the organization 10 for the IT product 14. Alternatively, if the selected vendor 16 cannot supply all of the IT product 14 for the organization

10, other vendors 16 are may be selected. Additionally, since it may be unwise to rely on a sole vendor 16, one or more secondary vendors 16 may also be designated to supply the IT product 14 for the organization 10.

CLOSURE (step 311)—After DELIVERY of the IT product occurs, closure takes place. Closure is important in that time is taken to assess what worked well during the acquisition process for the IT product 14 and what did not. In addition, in CLOSURE, project planning is closed out and archived. Also, the detailed estimate for the IT product 14 that was approved is compared with the final result to see what was accurate and what was not. Further, in CLOSURE, records are set up to maintain the IT product 14, and any intellectual property incumbent in developing the IT product is considered for protection. CLOSURE may also include a customer satisfaction survey or the like to determine whether what was delivered is satisfactory, and may also include a review of the selected vendor 16 to judge the vendor 16 on timeliness, quality of work, and how the vendor 16 is to be perceived.

For example, it may be concluded that the vendor 16 was considered good to work with, in which case the vendor 16 should be considered for developing and supplying other IT products 14 to the organization 10 as the need and opportunity arises. Conversely, it may be concluded that the vendor 16 was considered not good to work with, in which case the vendor should not be considered for developing and supplying other IT products 14 to the organization 10 unless circumstances dictate otherwise.

Generally speaking, by performing the steps of the business process of Policy 2 as set forth above and in FIG. 3, the entities 12 within an organization 10 are provided with a standard development course that such entities 12 must follow. Moreover, and importantly, by following such standard development course, project management is inherently performed without being a conscientious act and also without being perceived as an onerous act. More importantly, such standard development course is perceived by the entities 12 as a good tool that provides satisfactory results.

As should be understood, the present invention has been described primarily in terms of developing and supplying a IT product 14 such as a specialized computer software application to a relatively large organization 10. Nevertheless, and importantly, the present invention is also applicable to any other type of goods or service that may be supplied by a vendor 16, regardless of whether the vendor 16 actually has to develop the IT product 14. Accordingly, each other type of goods or service as vended by a vendor 16 may be considered to be within the spirit and scope of the present invention. Also importantly, the present invention is applicable to an organization 10 having any particular size.

Note that the present invention has been disclosed in terms of actions taking place during multiple steps or phases. Importantly, such steps or phases are descriptive only, and are not considered limiting. Thus, an action described in connection with one step or phase may as circumstances dictate take place in another step or phase without departing from the spirit and scope of the present invention. Likewise, a step or phase may take place out of the order described herein as circumstances dictate without departing from the spirit and scope of the present invention.

Note, too, that the present invention may be at least partially implemented by way of a computer system. Such computer system may be any computer system as is necessary and appropriate without departing from the spirit and scope of the present invention. Of course, the present invention may also be implemented substantially without any use of a computer system, also without departing from the spirit and scope of the present invention.

Note further that the terms 'IT service' and "IT product" and variations thereof are liberally employed herein. Such terms are considered to be interchangeable except as circumstances may otherwise require.

In the foregoing description, it can be seen that the present invention comprises a new and useful process in connection with an organization 10 for performing acquisition of an IT product 14 for multiple entities 12 within an organization 10 such that the obtained IT product 14 satisfies the needs of each entity 12. More generally, the present invention comprises a formalized approach to obtaining an IT product 14 such that each entity 12 within an organization 10 is obligated to obtain an IT product 14 in such formalized manner. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A framework in connection with an organization having a plurality of entities, the framework defining a minimum set of requirements that all entities within the organization must adhere to when acquiring an information technology (IT) product, the framework comprising:

a first policy that each entity of the organization must adhere to the framework;

a second policy defining a business process that each entity must follow when acquiring an IT product;

a third policy defining a set of tools for being employed to implement the business process of the second policy; and a fourth policy defining requirements specific to one or more of the entities within the organization, where the requirements specific to each entity are defined by such entity, wherein the business process of the second policy comprises:

initiating a business idea regarding acquiring an IT product, the business idea being based on factors including available technology and a rough feasibility estimate of cost and benefit;

developing the rough estimate into a detailed estimate including a cost of and a benefit of acquiring the IT product, the detailed estimate being employed to decide if and how to acquire the IT product and coinciding with composing a proposal including a funding request for funding from the organization for acquiring the IT product;

submitting the proposal to a centralized prioritizing agent for the organization, the centralized prioritizing agent performing a prioritization process including examining all proposals within the organization and determining whether to approve each proposal based on factors including need, cost, available funding, and priority;

upon receiving approval from the centralized prioritizing agent, developing requirements and planning for the IT product to be acquired by specifying the IT product in a more technologically specific manner; and receiving delivery of the IT product, wherein each entity has a desired technology state referred to during the business process, the desired technology state defining where the entity is desired to be in a technological sense, and wherein the business process includes determining that acquiring the IT product goes toward a business solution that is needed for achieving the desired technology state.

2. The framework of claim 1 further comprising a policy that different entities within the organization must work together to acquire the IT product when such IT product is substantially common to such different entities.

3. The framework of claim 1 wherein the second policy further comprises a common set of definitions of all rules and responsibilities for the entities when acquiring an IT product.

4. The framework of claim 1 wherein the third policy includes forms that are to be used during each stage of the business process of the second policy.

5. The framework of claim 4 wherein the third policy is embodied as a central repository accessible by all of the entities within the organization.

6. The framework of claim 5 wherein the repository is a database accessible by way of an electronic web page.

7. The framework of claim 1 wherein the first, second, and third policies are common to all entities within the organization, and wherein the fourth policy is specific to each entity within the organization.

8. The framework of claim 1 wherein the desired technology state for each entity is pre-defined and obtained from a model that takes factors selected from a group consisting of infrastructure, data, common systems, business units, customer interfaces, and combinations thereof.

9. The framework of claim 8 wherein the model takes into account that different entities within the organization can have IT requirements and operations.

10. The framework of claim 8 wherein in the business process, the centralized prioritizing agent determines from the model whether the IT product proposed for acquisition is common to entities other than the entity that submitted the proposal, and if so communicates with all of such entities to ensure that such will satisfy needs of every such entity.

11. The framework of claim 1 wherein in the business process, the centralized prioritizing agent refers to the desired technology state for the entity to ensure that the IT product proposed for acquisition furthers achieving the desired technology state for the entity.

12. The framework of claim 1 wherein in the business process, the proposal is revisited to determine the reasonableness thereof and, if no longer valid, another proposal is submitted.

13. The framework of claim 1 wherein in the business process, receiving delivery includes managing and monitoring development of the IT product by a vendor to ensure that all specifications for the IT product are satisfied.

14. The framework of claim 1 wherein the business process further comprises closure, including assessing acquiring the IT product.

15. A framework in connection with an organization having a plurality of entities, the framework defining a minimum set of requirements that all entities within the organization must adhere to when acquiring an information technology (IT) product, the framework comprising:
   a first policy that each entity of the organization must adhere to the framework;
   a second policy defining a business process that each entity must follow when acquiring an IT product;
   a third policy defining a set of tools for being employed to implement the business process of the second policy; and
   a fourth policy defining requirements specific to one or more of the entities within the organization where the requirements specific to each entity are defined by such entity,
wherein the business process of the second policy comprises:
   initiating a business idea regarding acquiring an IT product the business idea being based on factors including available technology and a rough feasibility estimate of cost and benefit;
   developing the rough estimate into a detailed estimate including a cost of and a benefit of acquiring the IT product, the detailed estimate being employed to decide if and how to acquire the IT product and coinciding with composing a proposal including a funding request for funding from the organization for acquiring the IT product;
   submitting the proposal to a centralized prioritizing agent for the organization, the centralized prioritizing agent performing a prioritization process including examining all proposals within the organization and determining whether to approve each proposal based on factors including need, cost, available funding, and priority;
   upon receiving approval from the centralized prioritizing agent, developing requirements and planning for the IT product to be acquired by specifying the IT product in a more technologically specific manner; and
receiving delivery of the IT product,
wherein in the business process, the requirements and planning for the IT product are developed with input from technologically oriented members of the acquiring entity regarding how the IT product should be developed and how the IT product should perform, and with input from business oriented members of the acquiring entity regarding what the IT product should do and the purpose of the IT product.

16. A business process in connection with an organization having a plurality of entities, the business process performed by each entity when acquiring an IT product and comprising:
   initiating a business idea regarding acquiring the IT product, the business idea being based on factors including available technology and a rough feasibility estimate of cost and benefit;
   developing the rough estimate into a detailed estimate including a cost of and a benefit of acquiring the IT product, the detailed estimate being employed to decide if and how to acquire the IT product and coinciding with composing a proposal including a funding request for funding from the organization for acquiring the IT product;
   submitting the proposal to a centralized prioritizing agent for the organization, the centralized prioritizing agent performing a prioritization process including examining all proposals within the organization and determining whether to approve each proposal based on factors including need, cost, available funding, and priority;
   upon receiving approval from the centralized prioritizing agent developing requirements and planning for the IT product to be acquired by specifying the IT product in a more technologically specific manner; and
   receiving delivery of the IT product,
   wherein each entity has a desired technology state referred to during the business process, the desired technology state defining where the entity is desired to be in a technological sense, and wherein the business process includes determining that acquiring the IT product goes toward a business solution that is needed for achieving the desired technology state.

17. The framework of claim 16 wherein the desired technology state for each entity is pre-defined and obtained from a model that takes factors selected from a group consisting of infrastructure, data, common systems, business units, customer interfaces, and combinations thereof.

18. The framework of claim 17 wherein the model takes into account that different entities within the organization can have IT requirements and operations.

19. The framework of claim 17 wherein in the business process, the centralized prioritizing agent determines from the model whether the IT product proposed for acquisition is common to entities other than the entity that submitted the proposal, and if so communicates with all of such entities to ensure that such will satisfy needs of every such entity.

20. The framework of claim 16 wherein in the business process, the centralized prioritizing agent refers to the desired technology state for the entity to ensure that the IT product proposed for acquisition furthers achieving the desired technology state for the entity.

21. The framework of claim 16 wherein in the business process, the proposal is revisited to determine the reasonableness thereof and, if no longer valid, another proposal is submitted.

22. The framework of claim 16 wherein in the business process, receiving delivery includes managing and monitoring development of the IT product by a vendor to ensure that all specifications for the IT product are satisfied.

23. The framework of claim 16 wherein the business process further comprises closure, including assessing acquiring the IT product.

24. A business process in connection with an organization having a plurality of entities, the business process performed by each entity when acquiring an IT product and comprising:

initiating a business idea regarding acquiring the IT product, the business idea being based on factors including available technology and a rough feasibility estimate of cost and benefit;

developing the rough estimate into a detailed estimate including a cost of and a benefit of acquiring the IT product, the detailed estimate being employed to decide if and how to acquire the IT product and coinciding with composing a proposal including a funding request for funding from the organization for acquiring the IT product;

submitting the proposal to a centralized prioritizing agent for the organization the centralized prioritizing agent performing a prioritization process including examining all proposals within the organization and determining whether to approve each proposal based on factors including need, cost, available funding, and priority upon receiving approval from the centralized prioritizing agent developing requirements and planning for the IT product to be acquired by specifying the IT product in a more technologically specific manner; and receiving delivery of the IT product, wherein in the business process, the requirements and planning for the IT product are developed with input from technologically oriented members of the acquiring entity regarding how the IT product should be developed and how the IT product should perform, and with input from business oriented members of the acquiring entity regarding what the IT product should do and the purpose of the IT product.

* * * * *